United States Patent
Groeschel (10) Patent No.: US 7,178,134 B2
(45) Date of Patent: Feb. 13, 2007

(54) METHOD AND APPARATUS FOR RESOLVING MEMORY ALLOCATION TRACE DATA IN A COMPUTER SYSTEM

(75) Inventor: Michael John Groeschel, Hampton, MN (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 10/422,683

(22) Filed: Apr. 24, 2003

(65) Prior Publication Data

US 2004/0216091 A1    Oct. 28, 2004

(51) Int. Cl.
G06F 9/44    (2006.01)
G06F 9/45    (2006.01)

(52) U.S. Cl. ............................. 717/128; 717/154
(58) Field of Classification Search ........ 717/124–128; 711/132–133, 202–206; 714/718
See application file for complete search history.

(56) References Cited

U.S. PATENT DOCUMENTS 6,161,200 A * 12/2000 Rees et al. ................. 714/38
6,301,646 B1 * 10/2001 Hostetter ................... 711/206
6,782,462 B2 * 8/2004 Marion et al. ............. 711/170
2002/0095660 A1 * 7/2002 O'Brien et al. ........... 717/127

* cited by examiner

Primary Examiner—Kakali Chaki
Assistant Examiner—Insun Kang
(74) Attorney, Agent, or Firm—Roy W. Truelson (57) ABSTRACT

Memory allocation trace data is analyzed by generating a sorted address index containing records of memory allocations, deallocations, and memory address inquiries. The list is scanned once in address order. During scan, a separate sequence index (ordered by sequential indicator) is dynamically maintained, having a record of all allocations pertinent to the current address in the scan. A record is added to the sequence index when its allocation is encountered, and deleted from the sequence index when the scan of the address index goes past the range of the allocated block. Any time a memory address inquiry is encountered during scan of the address index, the sequence indicator of the memory address inquiry is used to find the applicable memory allocation in the sequence index.

17 Claims, 9 Drawing Sheets

METHOD AND APPARATUS FOR RESOLVING MEMORY ALLOCATION TRACE DATA IN A COMPUTER SYSTEM

FIELD OF THE INVENTION

The present invention relates to digital data processing, and in particular to methods and apparatus for generating data concerning the performance characteristics of computer programs.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software having enhanced function, along with faster hardware.

In the very early history of the digital computer, computer programs which instructed the computer to perform some task were written in a form directly executable by the computer's processor. Such programs were very difficult for a human to write, understand and maintain, even when performing relatively simple tasks. As the number and complexity of such programs grew, this method became clearly unworkable. As a result, alternate forms of creating and executing computer software were developed.

The evolution of computer software has led to the creation of sophisticated software development environments. These environments typically contain a range of tools for supporting the development of software in one or more high-level languages. For example, interactive source editors support the initial generation of source code by a developer. Source databases may support collections of source modules or source objects, which serve as the component parts of software applications. Front-end compiler/debuggers perform simple semantic verification of the source and reduction to a standard form. Back-end or optimizing compilers generate machine executable object code from the standard form, and may optimize the performance of this code using any of various optimization techniques. Build utilities assemble multiple object code modules into fully functioning computer programs.

Among the tools available in many such programming development environments are a range of diagnostic and debug tools. Although compilers and debuggers used during the initial creation and compilation phases of development can identify certain obvious inconsistencies in source code and produce object code conforming to the source, they can not verify the logic of a program itself, or that the program makes use of available resources in an efficient manner. This is generally accomplished by observing the behavior of the program at "run-time", i.e., when executed under real or simulated input conditions. Various trace tools exist which collect data concerning the run-time behavior of a computer program. Analytical tools assist the programmer in analyzing the trace data to find logical errors, inefficiencies, or other problems with the code.

Data collected by trace tools might include various program parameters, such as code paths taken, procedures and functions called, values of key variables, storage accesses, and so forth. Among the data often collected is a record of instances of memory allocations. I.e., programs cause portions of a virtual memory space (which may be a virtual memory space associated with the program, or associated with some other entity, or a universal virtual memory space) to be allocated and deallocated during execution from a dynamic memory allocation area known as the "heap". Allocation may be for user-specified data structures such as "objects" in an object-oriented programming environment, or other records or arrays, or for stacks or other program constructs. Object allocation is particularly of interest, since many object-oriented languages tend to allocate a large number of short-lived objects from the heap, and the use and reuse of memory space on the heap significantly affects program performance.

Conventionally, a trace tool recording instances of memory allocations generates a sequential list of all the memory allocations and deallocations during program execution, each list entry including the address range (such as a starting address and length of the allocation) and a sequence indicator showing where in the execution of the program the allocation occurred. The sequence indicator is commonly a timestamp, but could conceivably be some other indicator tied to program instructions or other indicia of sequential execution. The collected memory allocation trace data may be analyzed after program execution to determine the state of memory allocations at any given time (sequence) in the program execution.

A trace tool may also collect trace data for each reference to memory during execution, in the form of a list of memory reference addresses and corresponding sequence indicators. When a program makes a reference to memory (such as a load or store), it is useful for diagnostic purposes to know to which instance of allocated memory the memory reference pertains. Because memory allocations may be of variable sizes and variable lifetimes, determining the applicable memory allocation for a given memory reference usually involves scanning the memory allocations until the applicable allocation is found, an operation which is performed separately for each memory reference. Thus, where there are N memory allocations and M references to be analyzed, the scope of the task of matching memory allocations to memory references in on the order of N*M.

As programs grow in size and complexity, and particularly as the use of object-oriented programming techniques grows, the task of analyzing memory allocations from trace data mushrooms. A need exists for a more efficient algorithm for analyzing memory allocations from trace data in a computer system.

SUMMARY OF THE INVENTION

Memory allocation trace data is analyzed by generating an index sorted by address containing records of memory allocations, deallocations, and memory address inquiries. The list is scanned once, from beginning to end. During scan, a separate sequence index (ordered by sequential indicator) is maintained, having a record of all allocations pertinent to the current address in the scan. Any time a memory address inquiry is encountered during scan of the main (address) index, the sequential indicator of the memory reference inquiry is used to find the applicable memory allocation in the sequence index.

In the preferred embodiment, a sequence-indexed allocation record is added to the sequence index whenever an allocation record is encountered during the scan of the main (address) index. At the same time, an end of allocation record, marking the end of the address range of a memory allocation, is inserted in the address index during the scan when a memory allocation is encountered, the record being inserted at a sorted location corresponding to the end of the memory allocation. This end of allocation record is used for maintaining the sequence index. Specifically, during the scan, whenever an end of allocation record is encountered, the corresponding allocation is deleted from the sequence index. It would alternatively be possible to maintain this information by other means, such as a separate end of allocation index.

In general, a memory address inquiry is a record of a memory address and sequence indicator, for which it is necessary to know the applicable memory allocation. In the preferred embodiment, memory address inquiries are memory references acquired as trace data during execution of the program. However, a memory address inquiry may have originated from some other source. For example, a programmer may simply want to know the state of a memory address at a particular time, such as when a procedure is called.

Because the sequence index is sorted by sequence, it is possible to quickly determine the applicable allocation entry for a given memory address inquiry. The order of complexity of this operation depends on the indexing technique used, but is generally less than order N. E.g., for a binary tree index, the complexity of finding the applicable entry in the sorting would be on the order of logN. If M memory address inquiries must be matched to N memory allocations, searching the sequence index is on the order of M logN.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Development Environment Overview

The present invention relates to the resolution of memory allocation trace data collected during execution of a computer program under simulated or actual conditions. In general, memory allocation data is used as part of a program development process, to identify errors in the flow of program execution, or to understand the effect of certain code procedures or instructions on the overall performance of the program. Such data might be used to provide feedback to a programmer, so that the programmer might correct defects or write code in a more efficient manner. It also might be used, in some circumstances, as input to an optimizing compiler, which would have the capability to employ alternative coding techniques to avoid performance bottlenecks arising from certain memory allocations. However, the present invention is not necessarily limited to these particular uses, and memory allocation data could conceivably be used for other purposes. For example, memory allocation data might be used to quantify or estimate system resource utilization, for purposes of determining whether additional resource (such as memory) is needed on the system.

Detailed Description

Figure 1:
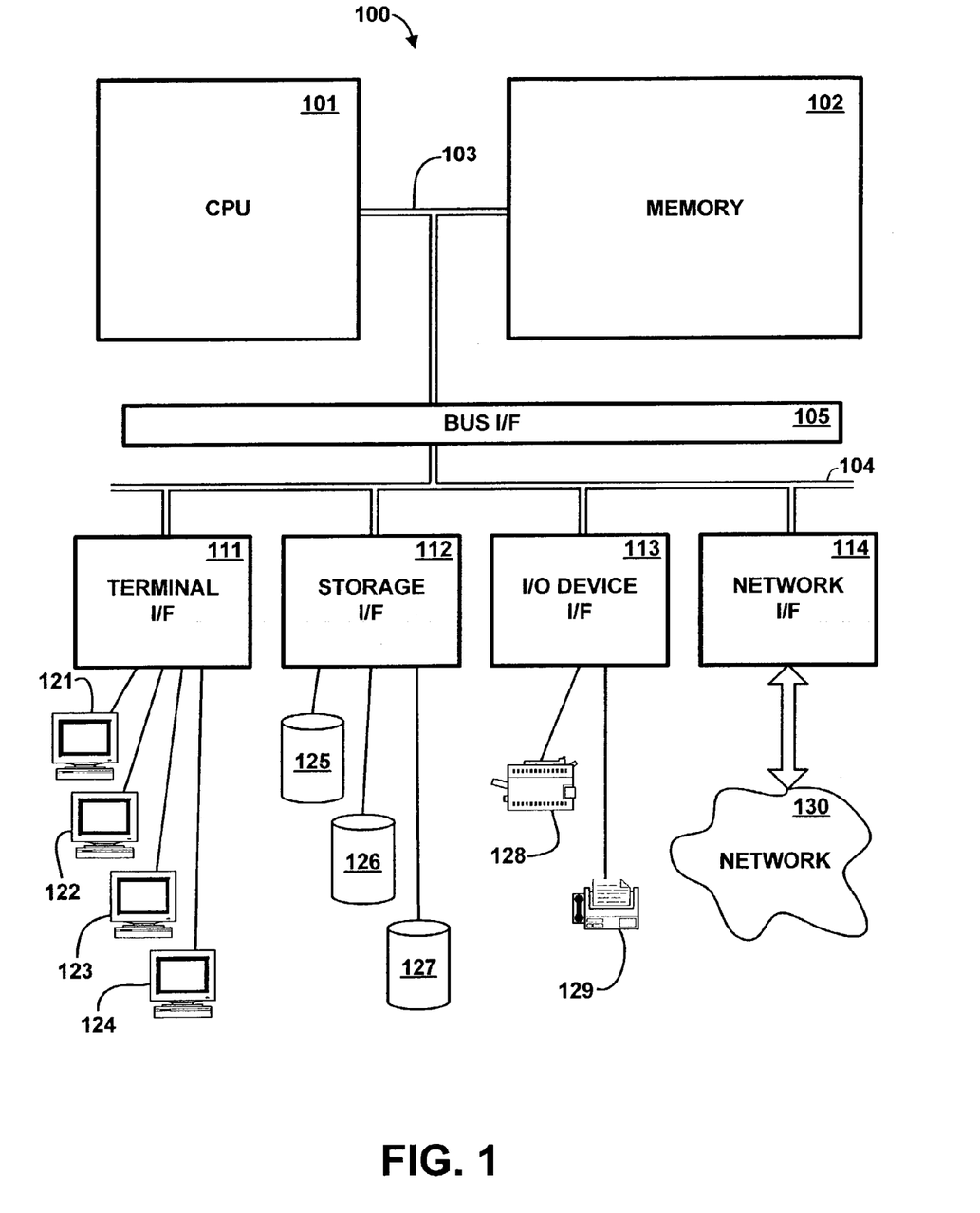
FIG. 1 is a high-level block diagram of the major hardware components of a computer system for collecting, analyzing and resolving memory allocation and memory reference trace data, according to the preferred embodiment of the present invention.

Referring to the Drawing, wherein like numbers denote like parts throughout the several views, FIG. 1 is a high-level representation of the major hardware components of a computer system 100 which collects, analyzes and resolves memory allocation trace data and memory reference data from execution of a computer program, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

Memory bus 103 provides a data communication path for transferring data among CPU 101, main memory 102 and I/O bus interface unit 105. I/O bus interface 105 is further coupled to system I/O bus 104 for transferring data to and from various I/O units. I/O bus interface 105 communicates with multiple I/O interface units 111–114, which may also be known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121–124. Storage interface unit 112 supports the attachment of one or more direct access storage devices (DASD) 125–127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPU 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121–124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicated with system 100 over network 130. Computer system 100 may alternatively be a single-user system, typically containing only a single user display and keyboard input.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
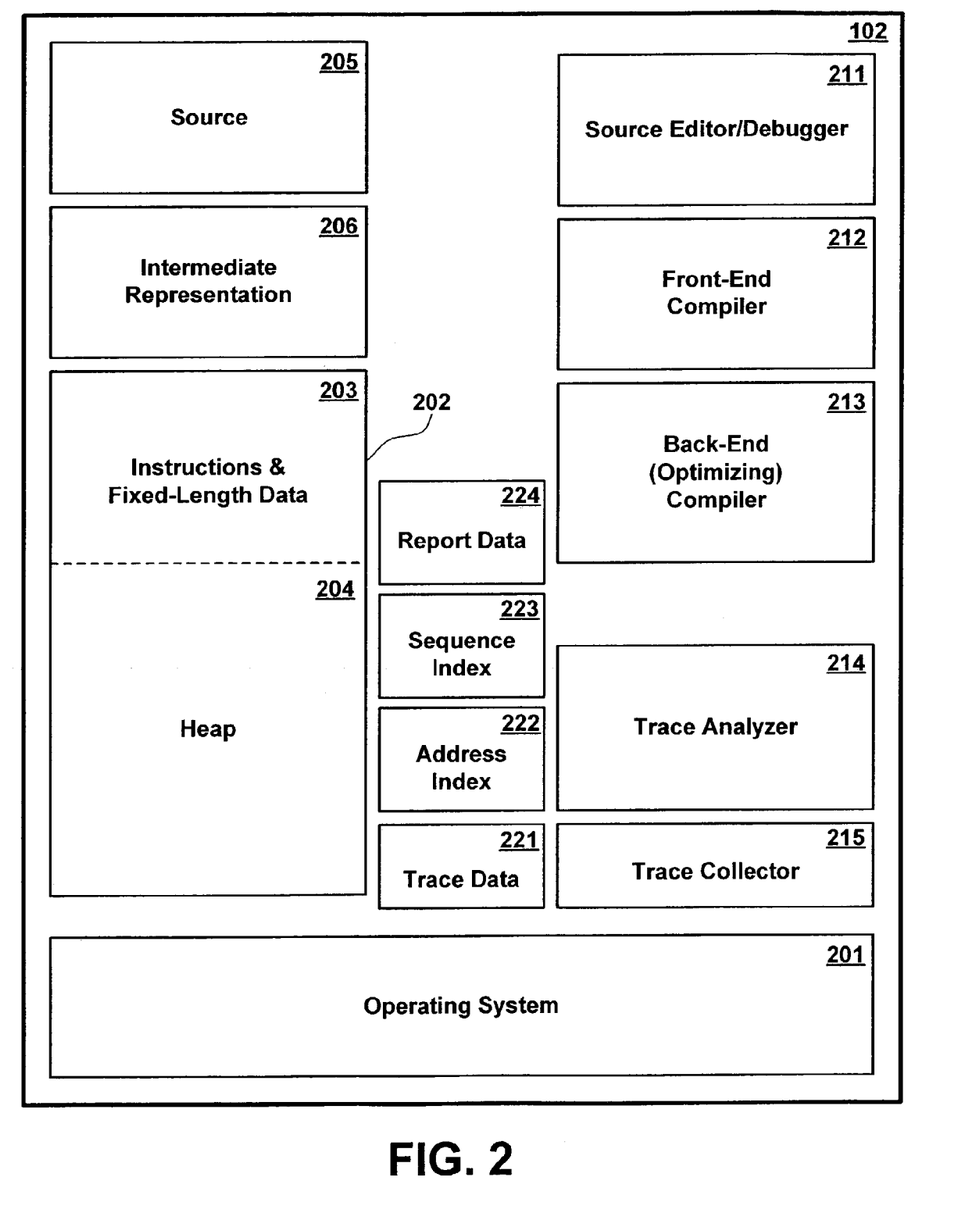
FIG. 2 is a conceptual illustration of the major software components of a computer system for analyzing memory trace data, according to the preferred embodiment.

FIG. 2 is a conceptual illustration of the major software components of system 100 in memory 102. Operating system kernel 201 provides various low-level software functions, such as device interfaces, management of memory pages, management and dispatching of multiple tasks, and so forth, as is well-known in the art. Monitored executable program memory space 202 contains a computer program in executable form for which memory allocation trace data is collected as further described herein. Monitored program space 202 includes a compiled portion of fixed length 203, containing instructions and fixed length data, and a dynamically allocated portion 204 referred to as the heap, which is memory space allocated for particular uses during execution of the program.

Source editor/debugger 211 is an executable computer program which supports the creation, editing and debugging of source code for other computer programs, using any of various known techniques. Source file 205 represents a file containing source code for program 202, which is created and edited using editor/debugger 211. Source editor 211 could be a general-purpose text editor which is non-specific to a programming language and has no debugging capabilities, but in the preferred embodiment is a special-purpose source editor (typically for a particular high-level language) having built-in debugging support features as are known in the art. Such a debugger may be able to present report data 224 generated by trace analyzer 214 to a user for supporting debug functions.

Front-end compiler 212 is an executable program which converts source file 205 to an intermediate representation 206. Intermediate representations may take any of various forms, but typically they provide some form of commonality between different source or object forms. I.e., source code written in different forms may be compiled by different front-end compilers to a common intermediate form for further compilation by a common back-end compiler. Alternatively, source code may be compiled by a single front-end compiler to a common intermediate form for use on different hardware platforms, the common intermediate form being then compiled by different back-end compilers associated with different respective hardware. Back-end compiler 213 is an executable computer program which compiles the intermediate representation 206 into object code modules of executable statements; compiler 213 is preferably an optimizing compiler. If back-end compiler 213 has optimizing capabilities, it may have the capability to receive memory allocation report data 224 generated by trace analyzer 214 and use this report data for optimizing the code it generates.

Trace data 221 concerning memory allocations is collected during execution of program 202 by trace collector 215. Trace analyzer 214 takes this trace data 221 as input to resolve the memory allocation, as described in greater detail herein. Address index 222 and sequence index 223 are data structures used by trace analyzer 214 to resolve the memory allocation data, as explained more fully herein. Trace analyzer produces report data 224 containing the results of this analysis. Report data 224 may be in a form formatted for printing and reading by humans, or may be in some other form for use by other programs, or there may be multiple copies of report data formatted in different forms for different uses.

Although trace collector 215 and trace analyzer 214 are shown as separate program entities in FIG. 2, it will be understood that some or all of the functions performed by these programs could be combined in a single program, or could be embedded in other programs, such as source editor/debugger 211 or back-end compiler 213. Address index 222, sequence index 223 and report data 224 are represented separately from trace analyzer 214 because they are data rather than executable code, but in fact they may occupy memory space within the allocation of memory for compiler trace analyzer 214. Furthermore, while source editor 211, front-end compiler 212, back-end compiler 213, trace analyzer 214 and trace collector 215 are shown as separate entities, it will be understood that these are often packaged together as part of an integrated application development environment. It will be further understood that in some programming development environments, there is no intermediate code representation, and front-end compiler 212 and back-end compiler 213 are effectively merged. There could alternatively be multiple levels of intermediate representation. Furthermore, it will be appreciated that some or all of these functions may be incorporated into an operating system. Additionally, although functional modules 211–215 are depicted in FIG. 2 on a single computer system 100 for completeness of the representation, it is not necessarily true that all functions will be present on a single computer system or will be performed on a single computer system. For example, editing of source code may be performed by source editors located in a distributed manner in individual workstations, while compiling and analysis of code might be performed by a centralized server.

Although a certain number of modules, programs or files are shown in the conceptual representation of FIG. 2, it will be understood that the actual number of such entities may vary, and in particular, that in a complex program development environment, the number of such entities is typically much larger. Furthermore, it will be understood that various entities could be stored in a distributed fashion on multiple computer systems.

While the software components of FIG. 2 are shown conceptually as residing in memory 102, it will be understood that in general the memory of a computer system will be too small to hold all programs and other data simultaneously, and that information is typically stored in data storage devices 125–127, comprising one or more mass storage devices such as rotating magnetic disk drives, and that the information is paged into memory by the operating system as required. Furthermore, it will be understood that the conceptual representation of FIG. 2 is not meant to imply any particular memory organizational model, and that system 100 might employ a single address space virtual memory, or might employ multiple virtual address spaces which overlap.

Figure 3:
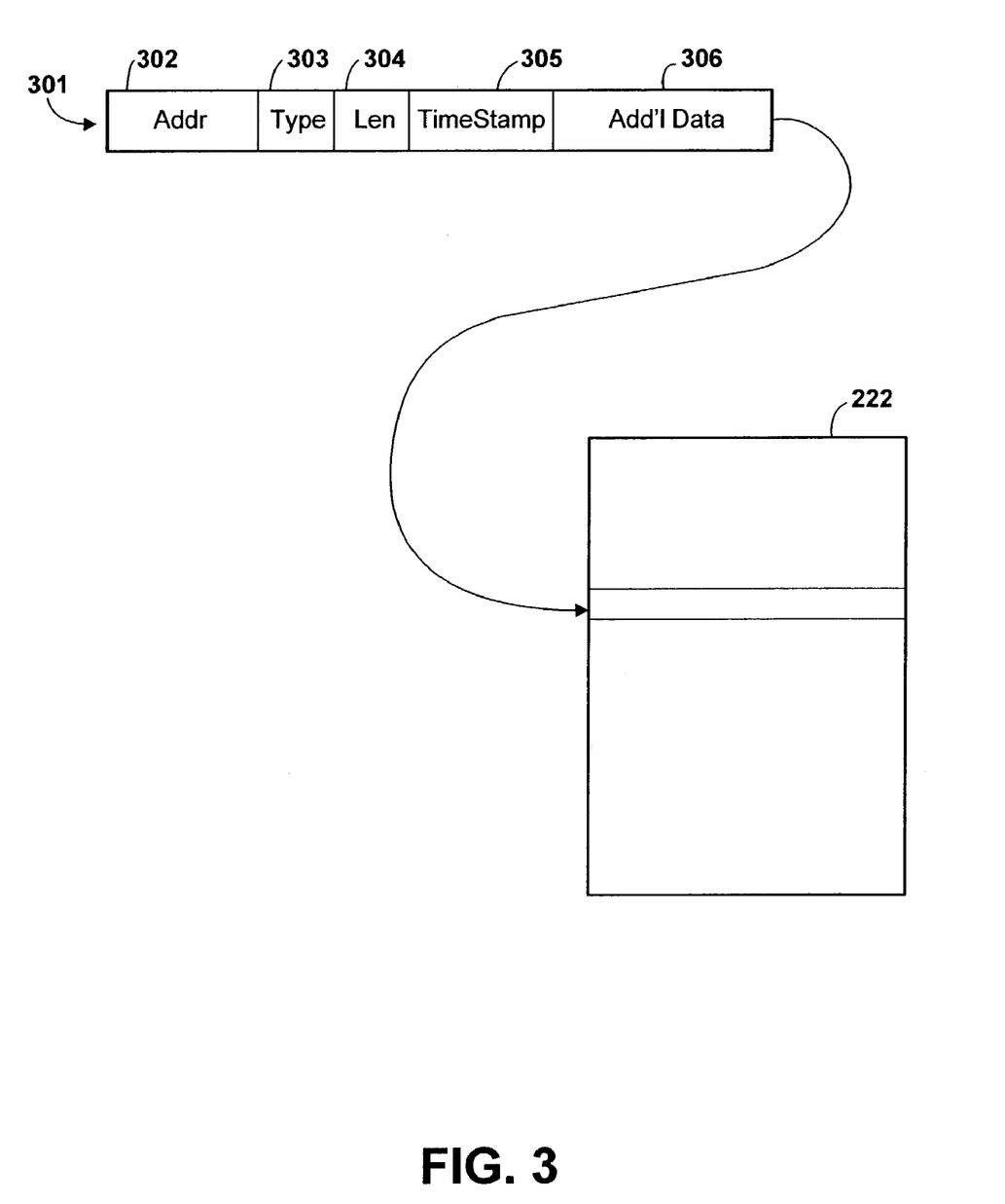
FIG. 3 is a conceptual illustration showing the structure of an address index for analyzing trace data, according to the preferred embodiment.

FIG. 3 is a conceptual illustration showing a structure of address index 222, according to the preferred embodiment. Address index 222 is conceptually a sorted list of entries, each entry 301 containing an address field 302, a type field 303, a length field 304, and a sequential indicator, which in the preferred embodiment is a timestamp 305. Each entry will typically contain at least some additional data, represented as field 306, which is not essential to understanding the trace analysis algorithm explained herein. This additional data might include, e.g, information concerning the instruction in the program which caused the memory allocation, or other state data at the time of the memory allocation. Such additional data might be contained in a separate data structure, with field 306 containing only a pointer to it.

There are four types of entries 301 in address index 222, the type of any entry being determined by the value of type field 303. Table 1 specifies the meaning of each type field value.

TABLE 1

Type Field Values

| Type | Meaning |
| --- | --- |
| 01 | Allocation entry which records a memory block allocation |
| 02 | Deallocation entry which records a memory block deallocation |
| 03 | Reference entry which records a memory reference |
| 04 | End of address range entry records last address of a memory allocation |

In the embodiment described herein, it will be assumed for clarity of explanation that an entry of type 03 represents a memory reference, for which the trace analyzer will determine the corresponding applicable memory allocation. I.e., the memory reference was actually recorded as an event during execution of program 202, when some instruction caused a particular address in memory to be referenced. However, in the general sense, an entry of type 03 could represent any virtual address and point in time for which it is desirable to know the applicable memory allocation, if any. I.e., an entry of type 03 need not have been generated as trace data during the execution of program 202, and may have been generated by a programmer as a form of inquiry, or by some other means. Therefore, the present invention should not be limited to instances in which memory references recorded as trace data are matched to corresponding memory allocations.

Address field 302 contains a virtual address in memory relating to the entry. For an entry of type 01 of 02 (memory allocation or deallocation), address field 302 contains the starting address of the memory block being allocated or deallocated. For an entry of type 03 (a reference entry), address field 302 is the address of the memory reference. For an entry of type 04 (end of address range), address field 302 contains the last address of an allocated memory block to which the entry pertains.

Length field 304 contains the length of a memory allocation or deallocation (for entries of type 01 or 02). Length field is not used for entries of type 03 or 04. Timestamp field 305 contains a timestamp (taken from system clock) at the time of the relevant event. I.e., the time of the memory allocation, memory deallocation, or memory reference, for entries of type 01, 02 or 03, respectively. For an entry of type 04, the timestamp is the time of the memory block allocation.

Entries in address index 222 are sorted in the field order shown, i.e., by the value in address field 302, and if these values are equal, by the value in type field 303, and so on (only the address field 302 and type field 303 are significant for purposes of sorting for the algorithm described herein). The index may be structured using any of various structures for sorted lists, and sorted using any of various sorting algorithms, either now known or hereafter developed. Details of a sorting algorithm and data (such as pointers) needed to support sorting are not provided here, because many such algorithms are well known and the present invention is not limited to any particular sorting technique. The technique chosen may depend on the number of entries expected in the address index.

Figure 4:
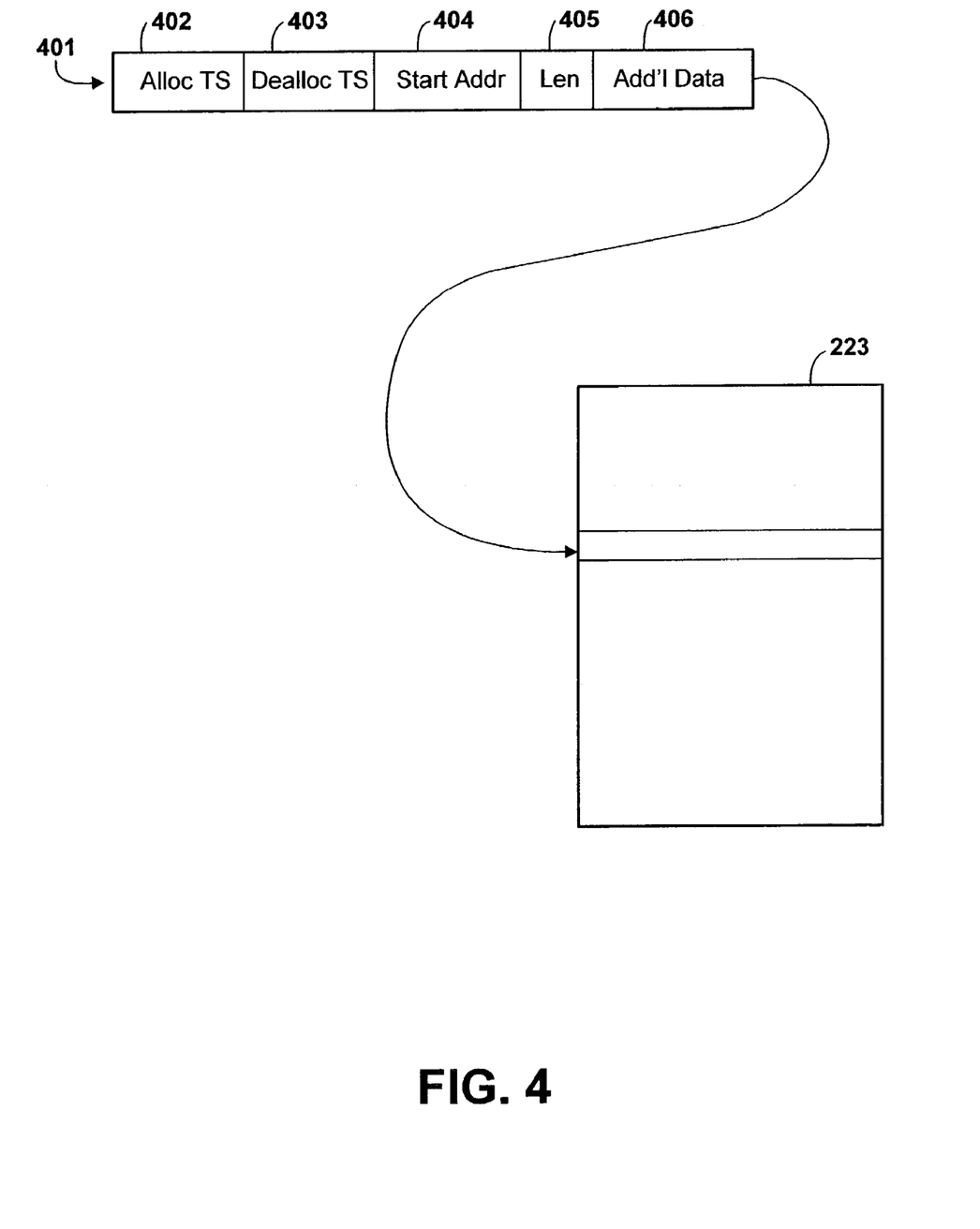
FIG. 4 is a conceptual illustration showing the structure of a sequence index for analyzing trace data, according to the preferred embodiment.

FIG. 4 is a conceptual illustration showing a structure of sequence index 223, according to the preferred embodiment. Sequence index 223 is conceptually a sorted list of entries, each entry 401 containing an allocation timestamp field 402 (i.e., an allocation sequential indicator), a deallocation timestamp field 403 (i.e., a deallocation sequential indicator), a starting address field 404, a length field 405, and optional additional data 406. Each entry in sequence indicator 223 may be said to correspond to a particular allocated memory block's lifespan. Allocation timestamp field 402 records the time the memory block was allocated. Deallocation timestamp field 403 records the time the memory block was deallocated. Starting address field 404 records the starting virtual address of the allocated block, and length field 405 records the length of the allocated block. Entries in sequence index 223 are sorted by the value in allocation timestamp field 402 (which is typically not duplicated), using any appropriate sorting technique.

In the preferred embodiment, address fields 302 and 404 record virtual addresses referenced in a single large virtual address space which is common to all processes executing on system 100. In other system environments, an address field might record an address in the virtual memory space of a particular process, or might record some other form of address, from which a meaningful correlation can be made to program instructions, events or some other entity being monitored.

Fields 305, 402 and 403 are referred to herein alternatively as "timestamps" and "sequential indicators". In the preferred embodiment, these fields contain a timestamp from the system clock. In general, a timestamp is a form of sequential indicator, and other sequential indicators might alternatively be used in fields 305, 402 and 403, as long as they are consistent. For example, a timestamp need not be a time from a system clock, but may be a local cycle counter within the program, or some other form of sequential indicator which would enable one to determine the sequence of events, i.e., as between any two events, which event occurred first.

It should be understood that FIGS. 3 and 4 are conceptual illustrations for purposes of explaining the trace analysis algorithm, and that the actual structure of a list of entries may be more complex. In particular, entries will typically contain at least some additional data, which is represented as fields 306 and 406, it being understood that these may in fact be multiple fields or other complex data structures. In particular, entries will generally contain some additional data for supporting the sorting technique used. E.g. entries may contain forward and backward pointers, pointers to a parent or root node, status bits, and so forth, depending on the sorting algorithm used. Furthermore, additional data in one or both indexes might include information concerning the instruction in the program which caused the memory allocation, or other state data at the time of the memory allocation, which may be useful to a programmer when debugging the code using memory allocation data. Additionally, data represented in FIGS. 3 and 4, such as additional data 306 and 406, or even other data fields, may be physically distributed across multiple data structures, with entries 301 or 401 containing appropriate references (such as pointers) to the additional data.

In accordance with the preferred embodiment, memory allocation trace data and memory reference trace data is collected during program execution. This data is used to construct a sorted address index, containing both memory allocation and memory reference entries. The sorted address index is then scanned one time, from beginning to end, to identify each memory reference with the corresponding applicable memory block allocation. During this scan, a sorted sequence index is dynamically maintained. The sequence index is effectively a small subset of the memory blocks which might be applicable to an address at the current scan point. When a memory reference is encountered in the scan, it is known that the applicable memory block allocation must be one of the entries in the sequence index. Because the sequence index is sorted by time, the time of the memory reference is used to find the applicable block in the sequence index (without scanning the entire sequence index). This process is explained in further detail, with reference to the accompanying figures, below.

Figure 5:
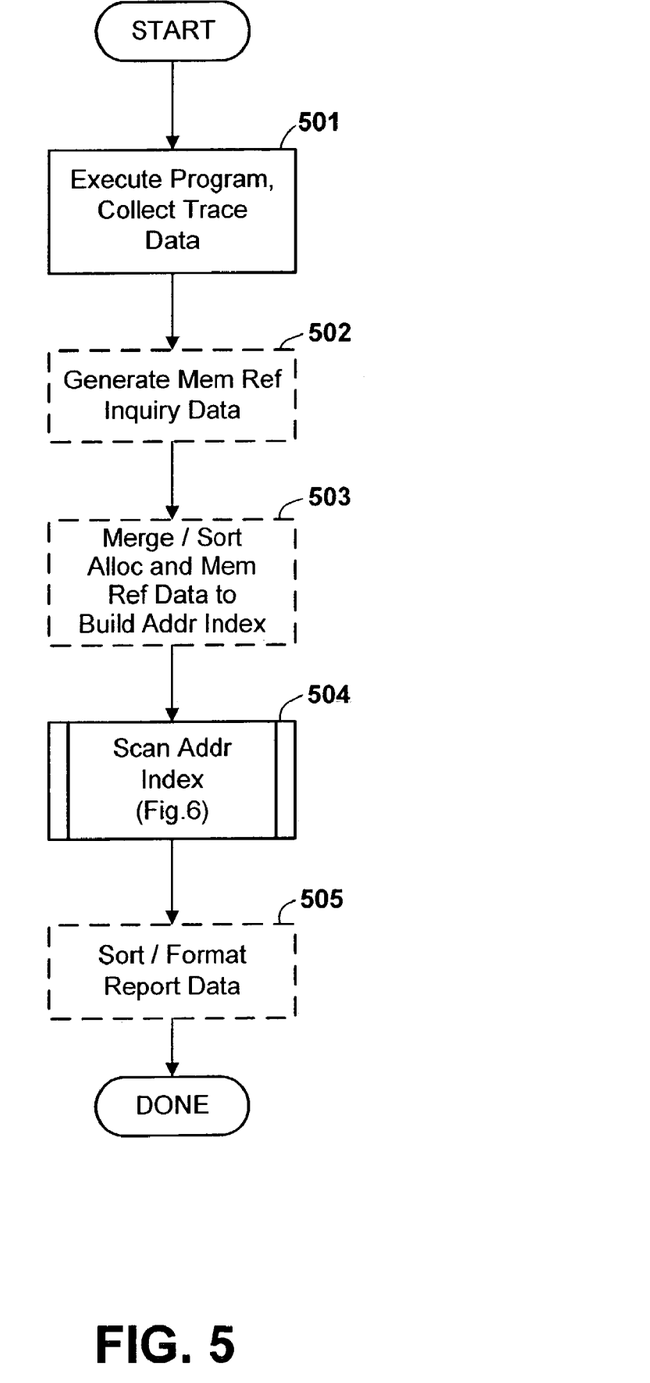
FIG. 5 is a high-level flow diagram showing the overall process of generating and analyzing memory allocation trace data, according to the preferred embodiment.

FIG. 5 is a high-level flow diagram showing the overall process of generating and analyzing memory allocation trace data, according to the preferred embodiment. Referring to FIG. 5, trace data 221 is collected by trace collector 215 during execution of program 202 under simulated or actual conditions (step 501). Trace data is a record of events occurring during a collection period; the collection period may coincide with a single process invocation of program 202, from the time the program is invoked until it terminates, or may be an arbitrary collection period unrelated to any single process which invokes program 202. Trace data includes a record of each memory block allocation and each memory block deallocation during the trace data collection period. In the preferred embodiment, trace data also includes a record of each memory reference or some subset of memory references (e.g., references caused by executing some previously identified instruction or instructions) occurring during the trace data collection period.

In the event that trace data does not include a record of memory references which are to be matched with memory block allocations, an optional step 502 of generating memory reference inquiry data is performed. I.e., in the abstract sense, a memory reference which is matched to a memory block allocation can be viewed as a query requesting the applicable memory block allocation for a particular address and time. A programmer could generate these queries separately from the trace data, without recording actual memory references during execution. Such queries might be triggered by the occurrence of certain events during program execution, such as procedure calls, interrupts, or other events. Step 502 might be performed by trace analyzer 214, or by some other function. Step 502 is outlined in broken lines to indicate that it is an optional step. In the preferred embodiment, the memory reference "queries" are trace data of actual memory references collected in step 501, and step 502 is not performed. Whether such memory reference "queries" are actual trace data or derived from some other source, they are referred to herein as memory references.

If necessary, the records of memory block allocations, memory block deallocations, and memory references are merged and sorted to build address index 222 (step 503). It is possible that trace collector 215 builds a sorted address index 222 containing memory block allocations, deallocations and memory references, during program execution, by inserting each new entry in its properly ordered location in the index. In this case, step 503 need not be performed, and for this reason step 503 is outlined in broken lines. If address index 222 is not already built, trace analyzer 214 generates and sorts any necessary records index 222, using an appropriate sorting algorithm. At the completion of any processing required in step 503, an address index 222 containing entries of type 01, 02 and 03 is complete and sorted according to address, type, length and timestamp, in that order. Entries of type 04 are created during the scanning process of step 504, and are not in the index at this pont.

The trace analyzer then scans the address index, one entry at a time, from beginning to end, to match all memory references with their respective corresponding memory block allocations. This process is illustrated in the high-level flow diagram of FIG. 5 as step 504, and shown in further detail in FIG. 6.

Figure 6:
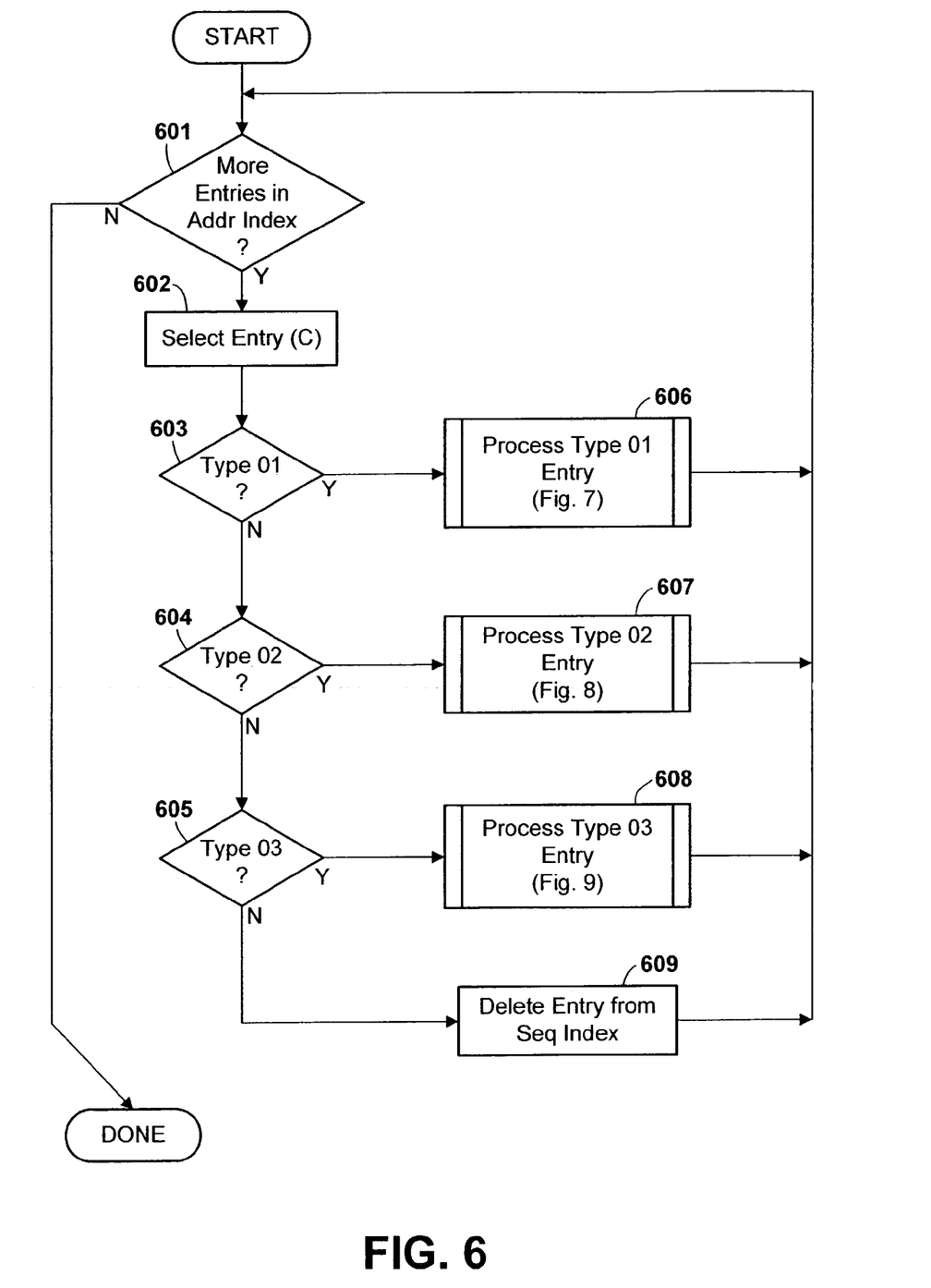
FIG. 6 is a flow diagram showing in expanded form the process of scanning a sorted index of memory block allocations and deallocations and memory references, within the process of FIG. 5, according to the preferred embodiment.

FIG. 6 is a flow diagram showing in expanded form the process of scanning address index 222, represented in FIG. 5 as step 504. The process begins by looking for another unexamined entry in the address index. If all entries have been examined, the "N" branch is taken from step 601 and the scan is complete. If any unexamined entries remain in the address index, the "Y branch is taken, and the next entry in the sorting order is selected as the current entry (step 602), designated entry "C".

If the selected entry C is a memory block allocation entry (an entry of type 01), the "Y" branch is taken from step 603, and the memory block allocation entry is processed to update both the address index 222 and sequential index 223. Processing of a memory block allocation entry is represented in FIG. 6 as step 606, and shown in further detail in FIG. 7.

Figure 7:
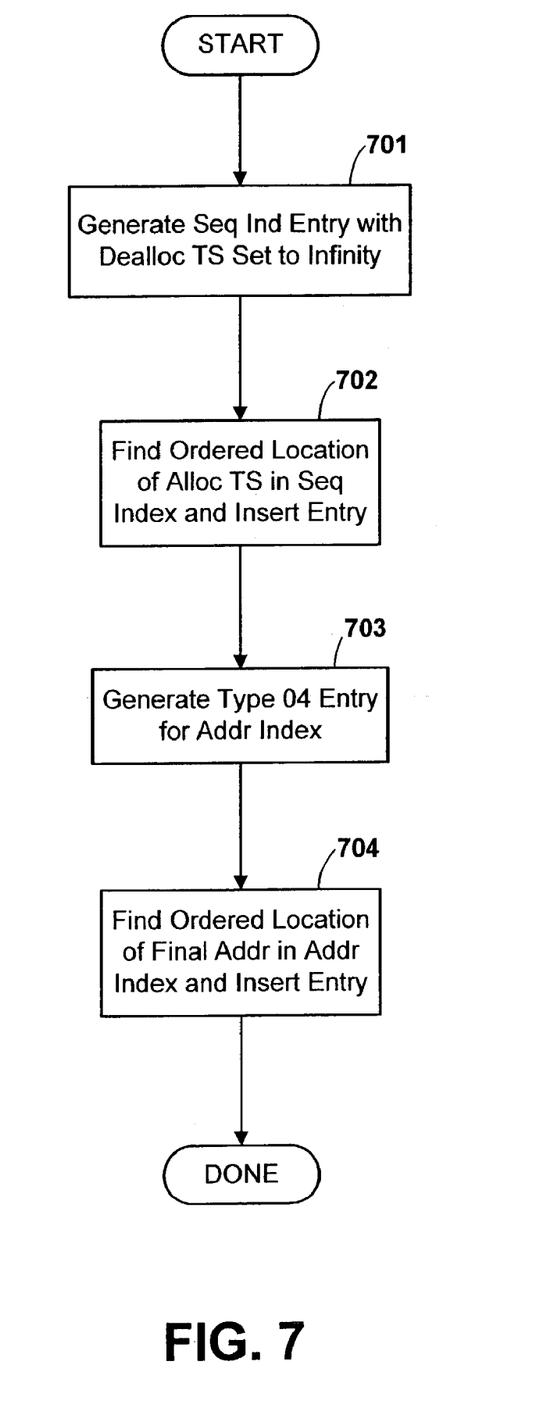
FIG. 7 is a flow diagram showing in expanded form the processing of a memory block allocation entry during scan of a sorted index of memory block allocations and deallocations and memory references, within the process of FIG. 6, according to the preferred embodiment.

FIG. 7 is a flow diagram showing in expanded form the processing of a memory block allocation entry, represented in FIG. 6 as step 606. When a memory block allocation entry (type 01) is found during scan of address index 222, the trace analyzer generates an entry 401 for the sequence index 223, corresponding to the memory block allocation made by the current memory block allocation entry C (step 701). The allocation timestamp value 402 for this sequence index entry is taken from timestamp field 305 of current memory block allocation entry C. The starting address 404 and length 405 are taken from address 302 and length 304 fields of allocation entry C.

At this point in the scan, the trace analyzer does not know the time at which the memory block allocated in entry C was deallocated, if indeed it was deallocated any time during the trace collection period, and therefore does not know what value should be placed in deallocation timestamp field 403 of the newly generated entry for tine sequence index. This is so because the deallocation entry (type 02) in the address index corresponding to allocation entry C is necessarily after entry C in the sorting order, and has not yet been encountered. It will be recalled that address index is sorted in order of address, followed by type. A deallocation entry, if it exists, will have the same starting address as entry C and a type of 02. Therefore, it must come after the memory block allocation entry C in the sorting, and it is likely to come immediately after or very soon after entry C. Because the corresponding deallocation entry, if it exists, should be very close to entry C in the sorting order of address index 222, it is possible to simply scan ahead to find the corresponding deallocation entry. However, it will be observed that the length of this scan will vary with N, the number of memory allocations (even though the constant of proportionality is likely to be quite small), and since the number of such forward scans required is also N, the scope of such a subtask is a function of $N^2$. Therefore, if a large amount of trace collection data is expected, an alternative method is preferred, as described herein. In the preferred embodiment, the deallocation timestamp field 403 is simply initialized to "infinity" at step 701, and is later adjusted as described herein if a corresponding deallocation entry is found. By "infinity", it is meant that any value which will be recognized to include the entire trace collection period may be placed in field 403. If a corresponding deallocation entry is not later found, then the memory block was not deallocated at any time during the trace collection period, and the initial value is correct.

The trace analyzer then finds the ordered location of the newly generated sequence index entry 401 in sequence index 223, according to the value of the allocation timestamp field 402, and inserts the newly generated entry into the sequence index (step 702). The allocation timestamp should be unique, and so this value alone will be sufficient to determine the correct ordered location in the sequence index. Finding a location in an ordered index using an index value can use any ordering method now known or hereafter developed.

The trace analyzer then generates an "end of address range" entry (type 04) for the address index (step 703). The address field value 302 of the end of address range entry represents the last address of the memory block allocated by entry C, and is computed from the address 302 and length 304 of allocation entry C. The type is set to 04. The length and timestamp are copied from the corresponding fields of allocation entry C. The trace analyzer then determines the appropriate ordered location for the newly generated "end of address range" entry in address index 222, using the index values of address field 302, type field 303, length field 304, and timestamp field 305, in that order (step 704). The entry is inserted into the address index. Because the ending address of an allocation can not be less than the starting address, the "end of address range" entry is necessarily inserted somewhere following entry C in the sorting order.

This completes processing of a memory block allocation entry. Referring back to FIG. 6, upon completion of step 606, the trace analyzer returns to step 601 to select the next sequential entry in the address index for processing.

If, at step 603, it is determined that the current entry C is not type 01, the "N" branch is taken to step 604. If the selected entry C is a memory block deallocation entry (an entry of type 02), the "Y" branch is taken from step 604, and the memory block deallocation entry is processed to update sequential index 223. Processing of a memory block deallocation entry is represented in FIG. 6 as step 607, and shown in further detail in FIG. 8.

Figure 8:
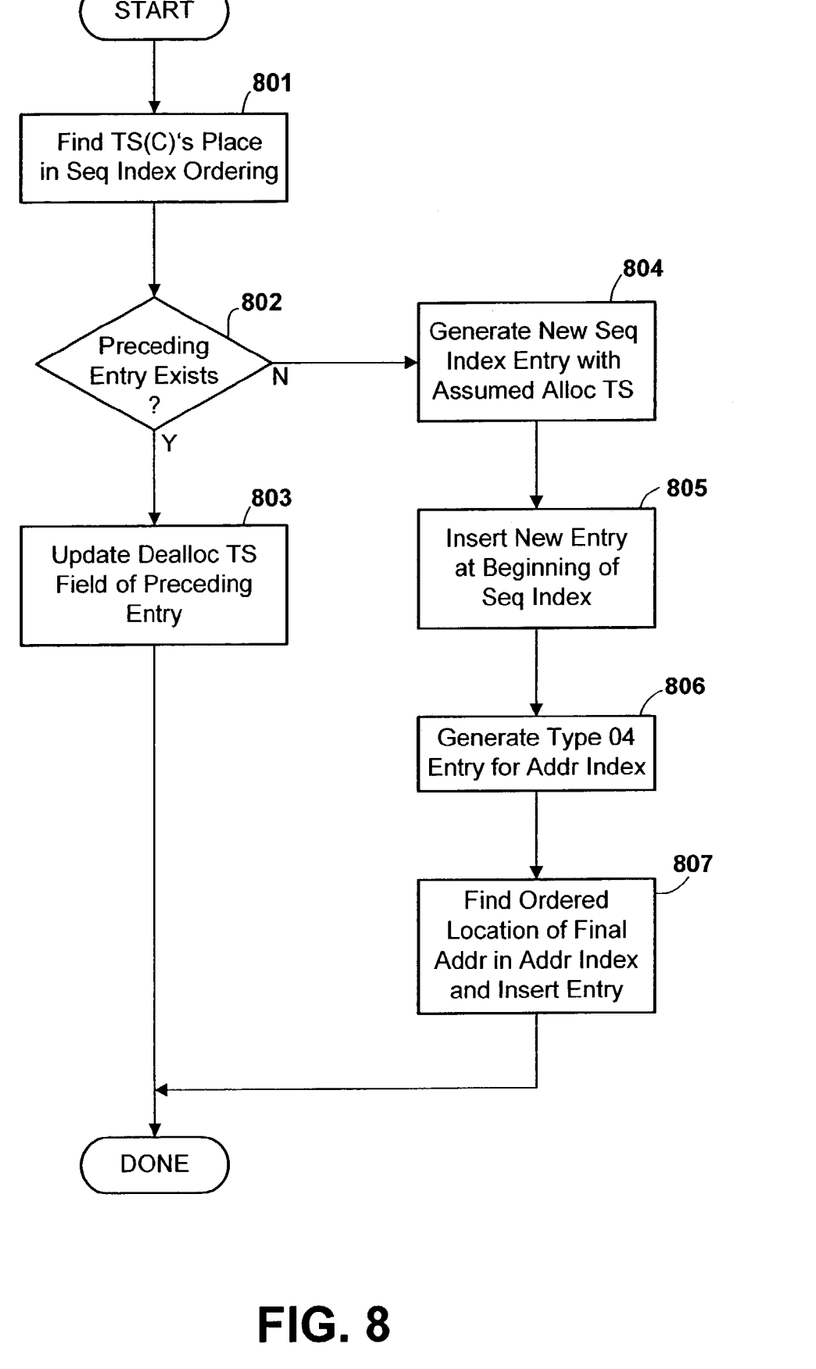
FIG. 8 is a flow diagram showing in expanded form the processing of a memory block deallocation entry during scan of a sorted index of memory block allocations and deallocation and memory references, within the process of FIG. 6, according to the preferred embodiment.

FIG. 8 is a flow diagram showing in expanded form the processing of a memory block deallocation entry, represented in FIG. 6 as step 607. Processing of a memory block deallocation entry involves updating the deallocation timestamp field 403 in the corresponding entry in sequence index 223, which was previously initialized to "infinity". Accordingly, the trace analyzer first locates the corresponding entry in the sequence index, by using entry C's timestamp value 305 (i.e., the deallocation timestamp) as an index into the sequence index (step 801). I.e., the trace analyzer finds the hypothetical location in the sequence index at which entry C's timestamp would be inserted if it were a new entry, but does not actually insert any new entry. This hypothetical location may be between two existing entries in the sequence index, or may be after the last entry in the sequence index, or may be before the first entry in the sequence index; however, since timestamps are unique, entry C's timestamp will not be equal to the timestamp of any existing entry in the sequence index.

If there is an existing entry in the sequence index immediately preceding this hypothetical location, then this existing entry is the sequence index entry corresponding to the deallocation of entry C (and will currently have a deallocation timestamp 403 of "infinity"). If such a corresponding entry exists, the "Y" branch is taken from step 802. The sequence index entry thus located is the correct corresponding entry because: (a) any memory allocations which do not include the starting memory address of current deallocation entry C are either not yet in the sequence index or have already been removed from the sequence index, as explained later with respect to step 609; (b) any memory allocations which do include the starting memory address but occur at a later time than the current deallocation entry C are later in the sorting order of the sequence index; (c) any memory allocations which do include the starting memory address but occur earlier in time than the memory allocation corresponding to current deallocation entry C occur earlier in the sorting order in the sequence index; and (d) any memory allocation occurring in time after the memory allocation corresponding to the current deallocation entry C and before deallocation entry C can not include the starting memory address of deallocation entry C, or there would be a memory conflict (and therefore are not in the sequence index for reasons (a) above).

If a corresponding entry in the sequence index was found ("Y" branch from step 802), the deallocation timestamp field 403 of this entry is updated with the timestamp field value 305 from the current deallocation entry C (step 803), and processing of deallocation entry C is complete, and the trace analyzer returns to step 601 to get the next entry in the address index.

However, there is one special case that deserves mention. If the trace data collection period does not coincide with a single process invocation of program 202, it is possible that an allocation of a memory block would have been made before the trace collection began, and no corresponding memory allocation exists. If such is the case, the "N" branch is taken from step 802. In this event, an allocation can be assumed having a timestamp equal to the beginning of the trace collection. The trace analyzer therefore generates a corresponding sequence index entry having an assumed allocation timestamp 402, which could be any value which will begin at or before the trace collection period (step 804). This value should be a unique value, so that it is easy to find the entry for later removal (at step 609). This new entry is then inserted into the sequence index at its proper location, i.e., at the beginning of the sequence index (step 805). The trace analyzer then generates a corresponding "end of sequence" (type 04) entry for the address index, again using an assumed timestamp value (step 806). It finds the ordered location of the newly generated entry, and inserts this newly generated entry into the address index (step 807). Steps 806 and 807 are essentially the same as steps 703 and 704 described earlier.

If the entry was not type 02 at step 604, the "N" branch is taken to step 605. If the entry is type 03 (memory reference), the "Y" branch is taken from step 605. The trace analyzer processes the memory reference to find the corresponding memory block allocation from the sequence index. This process is represented in FIG. 6 as step 608, and shown in greater detail in FIG. 9.

Figure 9:
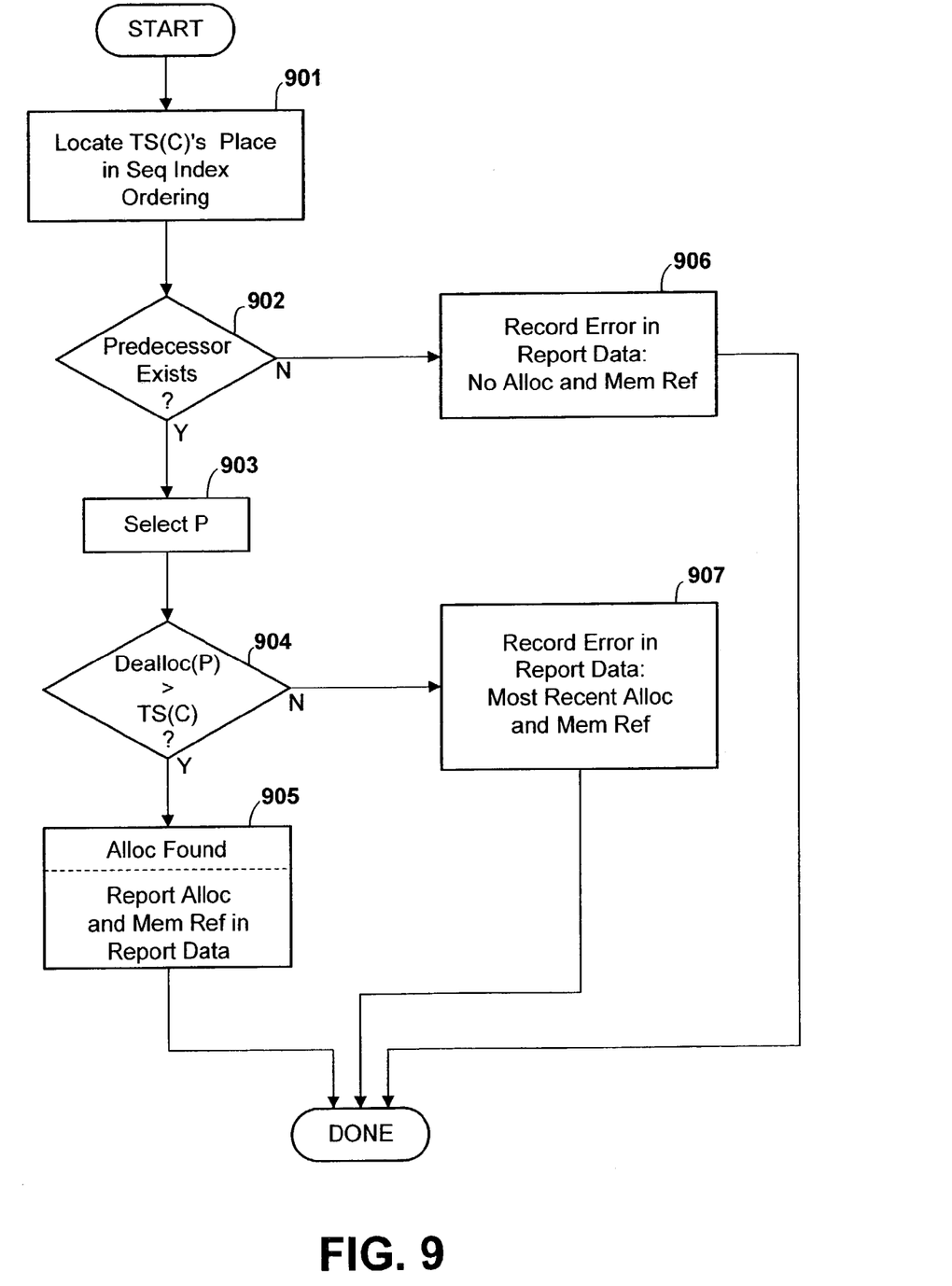
FIG. 9 is a flow diagram showing in expanded form the processing of a memory reference entry during scan of a sorted index of memory block allocations and deallocations and memory references, within the process of FIG. 6, according to the preferred embodiment.

FIG. 9 is a flow diagram showing in expanded form the processing of a memory reference entry, represented in FIG. 6 as step 608. When a memory reference entry C is encountered, the trace analyzer determines the location at which the timestamp value 305 of entry C would be ordered in the ordered sequence of allocation times 401 in sequence index 223 (step 901). I.e., if a sequence index entry having an allocation time field 401 value equal to the value of the timestamp of C were to be inserted in the sequence index, at what hypothetical location would this be inserted to maintain proper sorting order? This is essentially the same as step 801. Note however that, unlike the case of a deallocation timestamp entry in step 801, it is possible for a memory reference entry C to have a timestamp value exactly equal to the timestamp of a corresponding memory allocation, if, for example, the memory reference entry is the result of a user-generated query.

The memory allocation entry corresponding to memory reference entry C should be the entry in the sequence index at or immediately preceding the hypothetical sorting location found in step 901. If such an entry exists, the "Y" branch is taken from step 902. This predecessor is selected as entry P (step 903).

The trace analyzer then verifies that the deallocation timestamp field 403 from entry P is greater (later in time) than the timestamp of the memory reference, i.e., the timestamp value from field 305 of current entry C. If so, then memory reference C occurred after the memory block represented by entry P was allocated and before the memory block was deallocated. In this case, the "Y" branch is taken from step 904, indicating that the correct memory allocation has been found. The trace analyzer then takes whatever steps are necessary to record the correct memory block corresponding to memory reference C (step 905). In general, this may be represented as recording the correspondence in report data 224. Report data may take any appropriate form, as required by the user's needs. Report data may be a searchable and indexable database, or it may be a flat file. Additionally, trace analyzer may place pointers in any of the entries in address index 222 or elsewhere to point to data in report data 224. Although report data 224 is represented in FIG. 2 as an entity separate from address data 222, in fact report data may be combined with address index 222 or other data to create a unified database which includes the association between memory references and memory allocations as determined by the trace analyzer above.

If, at step 902, the trace analyzer does not find a predecessor, the "N" branch is taken, and an error condition is recorded in report data (step 906). Similarly, if at step 904, the deallocation timestamp is not after the memory reference timestamp, the "N" branch is taken from step 904, and an error condition is recorded in report data (step 907). Steps 906 and 907 are represented separately because the two error conditions are different and may require different reporting. In the case of step 906, no memory allocation exists for the address of the memory reference. In the case of step 907, at least one memory allocation exists for this address, but this memory block had already been deallocated before the memory reference occurred. In the latter case, it may be useful to report one or more of the most recent memory allocations with the error data. The form of the error report will vary with the intended use of the report data, and the error may be contained in a separate report of errors, on integrated into other report data.

After processing the memory reference entry (completion of steps 905, 906, or 907, as the case may be), the trace analyzer returns to step 601 to select the next sequential entry in the address index for processing.

If, at step 605, it is determined that the current entry C is not type 03, the "N" branch is taken to step 609. In this case, the selected entry must be an "end of address range" entry type 04. When an end of address range entry is encountered in the scan, all memory references applicable to the memory block allocation have already been encountered, due to the nature of the sorting. Therefore, the corresponding entry from the sequence index is deleted. The timestamp of the end of address index (field 305) is used to index an entry in the sequence index, which should be unique. When the entry is found, it is deleted from the sequence index (step 609). The trace analyzer then returns to step 601 to select the next sequential entry in the address index for processing.

When all entries in the address index have been processed and the scan is complete, the trace analyzer performs any required post-processing of the report data, represented in FIG. 5 as optional step 505. Such post-processing could include, e.g., sorting the report data in a desired order, printing or saving it in some designated format, etc. It is possible that no additional post-processing is needed.

It will be observed that there is a single scan of the address index and various subtasks initiated by that scan. Several subtasks involve locating an entry in the sequence index or address index. The sequence index has a size proportional to N, the number of memory allocations, and the address index a maximum size of 3N+M, where M is the number of memory references. The difficulty of searching these indexes is therefore on the order of logN or logM, and as the number of times a subtask is performed is either N or M, the scope of the overall task is no greater than the order of (M+N)log (M+N). If N and M are the same order of magnitude, then the scope is on the order of N*logN. This is a substantial improvement over a "brute force" technique of scanning a set of allocations for each one of a set of references (scope of task on the order of N*M).

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as system memory 102, and as data storage devices 125–127.

In general, the memory allocation trace analysis algorithm described herein dynamically maintains a sequence index which is applicable to the current memory location in the scan of the address index. In the preferred embodiment, the trace analysis algorithm maintains the sequence index by generating a sequence index entry when an allocation is encountered, updating the sequence index entry when a deallocation is encountered, and deleting the entry when an "end of address range" entry is encountered. However, it would alternatively be possible to maintain the sequence index using different methods. For example, as explained earlier, it would be possible to scan ahead for a deallocation entry when created in the sequence index entry, rather than update it later when the deallocation is encountered in the scan of the address index. Additionally, alternative mechanisms might be used for deleting entries from the sequence index. For example, rather than insert an "end of address range" entry to determine when to remove a sequence index entry, sequence index entries could be deleted whenever stale entries are encountered while trying to locate the entry applicable to a memory reference. This might mean that some stale entries remain in the sequence index a long time or indefinitely, but each stale index would be encountered only once before removal, so the accumulation of some stale entries would not have a significant deleterious effect on overall performance. Other variations are possible.

In the preferred embodiment, a sequence index is dynamically maintained during scan of an address index. It would alternatively be possible to obtain similar results by dynamically maintaining an address index while scanning a sequence index. I.e., the events (such as allocations, deallocations, and memory inquiries) are initially contained in a sorted sequence index, the sequence index is scanned in order, and during the scan a separate address index is maintained, containing all allocations applicable to a sequence number or time corresponding to the scan. One possible advantage of this alternative approach is that, in some applications, trace data may already be sorted in sequential order, so that no additional sorting step is necessary. However, the method described as the preferred embodiment herein has certain advantages over this alternative technique. For one thing, in the alternative technique it is difficult to deal with deallocations for which no corresponding allocation exists (e.g., one might perform a full scan of the sequence index for such deallocations first, followed by the regular scan of the sequence index). A second advantage of the preferred embodiment is that, when a memory reference is made to an unallocated address, the history of prior allocations and deallocations at this address is readily available from the sequence index for inclusion in an error report.

Although a specific embodiment of the invention has been disclosed along with certain alternatives, it will be recognized by those skilled in the art that additional variations in form and detail may be made within the scope of the following claims:

What is claimed is:

1. A method for analyzing memory allocation trace data for a computer program, comprising the steps of:

recording a plurality of memory block allocations and deallocations during execution of said computer program;

constructing a sorted address index, said sorted address index containing entries of a plurality of types, including a first type entry corresponding to a memory block allocation, a second type entry corresponding to a memory deallocation, and a third type entry corresponding to a memory address inquiry, said address index being sorted by address;

scanning said sorted address index in order of said entries, said scan proceeding sequentially in address order;

dynamically maintaining a sorted sequence index of entries while performing said step of scanning said sorted address index, each entry in said sorted sequence index corresponding to a respective memory allocation, said entries in said sorted sequence index being sorted by chronological sequence indicator, said sorted sequence index containing all memory allocations applicable to a current address in the sequential address order of said scanning step;

upon encountering a memory address inquiry entry while performing said step of scanning said sorted address index, using a chronological sequence indicator value of the encountered memory address inquiry entry to locate an entry in said sorted sequence index, said entry in said sorted sequence index representing a memory block allocation corresponding to the encountered memory address inquiry entry, and recording an association between the encountered memory address inquiry entry and the memory block allocation corresponding to said encountered memory address inquiry entry.

2. The method for analyzing memory allocation trace data for a computer program of claim 1, wherein said chronological sequence indicator is a timestamp.

3. The method for analyzing memory allocation trace data for a computer program of claim 1, wherein said sorted address index comprises entries of said third type which are automatically derived from trace data recording memory references during execution of said computer program, each said entry of said third type corresponding to a respective memory reference made during execution of said computer program.

4. The method for analyzing memory allocation trace data for a computer program of claim 1, wherein said sorted address index comprises entries of said third type which are derived from user queries.

5. The method for analyzing memory allocation trace data for a computer program of claim 1, wherein said sorted address index is sorted primarily according to address, and, if the addresses of any two or more entries in said index are equal, then as among said two or more entries whose addresses are equal, said sorted address index is sorted according to type, said entries of the first type coming before entries of the second type, and said entries of the second type coming before entries of the third type.

6. The method for analyzing memory allocation trace data for a computer program of claim 1, wherein said step of dynamically maintaining a sorted sequence index comprises:

inserting an entry of a fourth type in said sorted address index and a corresponding entry in said sorted sequence index whenever an entry of said first type is encountered during said step of scanning said sorted address index, said entry of a fourth type indicating an end of address range, said entry of a fourth type being inserted at an address corresponding to the end of the memory block allocation represented by the encountered entry of said first type; and deleting said corresponding entry from said sorted address index when said entry of a fourth type is encountered during said step of scanning said sorted address index.

7. The method for analyzing memory allocation trace data for a computer program of claim 1, wherein said step of dynamically maintaining a sorted sequence index comprises:

inserting a corresponding entry in said sorted sequence index whenever an entry of said first type is encountered during said step of scanning said sorted address index, said corresponding entry in said sorted sequence index having a chronological sequence indicator equal to a chronological sequence indicator in said entry of said first type, and a deallocation chronological sequence indicator equal to a default value; and updating said deallocation chronological sequence indicator in said corresponding entry inserted in to said sorted sequence index if an entry of said second type corresponding to said entry of said first type is encountered during said step of scanning said sorted address index, said deallocation chronological sequence indicator being updated with a value equal to a value of a chronological sequence indicator in said entry of said second type.

8. The method for analyzing memory allocation trace data for a computer program of claim 1, wherein said step of dynamically maintaining a sorted sequence index comprises:

if an entry of said second type is encountered during said step of scanning said sorted address index for which no corresponding entry of said first type has previously been encountered during said step of scanning said sorted address index, then inserting a corresponding entry in said sorted sequence index, said corresponding entry in said sorted sequence index having a chronological sequence indicator equal to an assumed value, said corresponding entry in said sorted sequence index further having a deallocation chronological sequence indicator equal to a value of a chronological sequence indicator in said entry of said second type.

9. A computer program product for analyzing memory allocation trace data, comprising:

a plurality of executable instructions recorded on tangible signal-bearing media, wherein said instructions, when executed by at least one processor of a digital computing device, cause the device to perform the steps of:

constructing a sorted address index from memory allocation trace data obtained during execution of a computer program, said sorted address index containing entries of a plurality of types, including a first type entry corresponding to a memory block allocation, a second type entry corresponding to a memory deallocation, and a third type entry corresponding to a memory address inquiry, said address index being sorted by address;

scanning said sorted address index in order of said entries, said scan proceeding sequentially in address order;

dynamically maintaining a sorted sequence index of entries while performing said step of scanning said sorted address index, each entry in said sorted sequence index corresponding to a respective memory allocation, said entries in said sorted sequence index being sorted by chronological sequence indicator, said sorted sequence index containing all memory allocations applicable to a current address in the sequential address order of said scanning step;

upon encountering a memory address inquiry entry while performing said step of scanning said sorted address index, using a chronological sequence indicator value of the encountered memory address inquiry entry to locate an entry in said sorted sequence index, said entry in said sorted sequence index representing a memory block allocation corresponding to the encountered memory address inquiry entry, and recording an association between the encountered memory address inquiry entry and the memory block allocation corresponding to said encountered memory address inquiry entry.

10. The computer program product for analyzing memory allocation trace data of claim 9, wherein said chronological sequence indicator is a timestamp.

11. The computer program product for analyzing memory allocation trace data of claim 9, wherein said sorted address index comprises entries of said third type which are automatically derived from trace data recording memory references during execution of said computer program, each said entry of said third type corresponding to a respective memory reference made during execution of said computer program.

12. The computer program product for analyzing memory allocation trace data of claim 9, wherein said sorted address index comprises entries of said third type which are derived from user queries.

13. The computer program product for analyzing memory allocation trace data of claim 9, wherein said sorted address index is sorted primarily according to address, and, if the addresses of any two or more entries in said index are equal, then as among said two or more entries whose addresses are equal, said sorted address index is sorted according to type, said entries of the first type coming before entries of the second type, and said entries of the second type coming before entries of the third type.

14. The computer program product for analyzing memory allocation trace data of claim 9, wherein said step of dynamically maintaining a sorted sequence index comprises:
   inserting an entry of a fourth type in said sorted address index and a corresponding entry in said sorted sequence index whenever an entry of said first type is encountered during said step of scanning said sorted address index, said entry of a fourth type indicating an end of address range, said entry of a fourth type being inserted at an address corresponding to the end of the memory block allocation represented by the encountered entry of said first type; and
   deleting said corresponding entry from said sorted address index when said entry of a fourth type is encountered during said step of scanning said sorted address index.

15. The computer program product for analyzing memory allocation trace data of claim 9, wherein said step of dynamically maintaining a sorted sequence index comprises:
   inserting a corresponding entry in said sorted sequence index whenever an entry of said first type is encountered during said step of scanning said sorted address index, said corresponding entry in said sorted sequence index having a chronological sequence indicator equal to a chronological sequence indicator in said entry of said first type, and a deallocation sequence indicator equal to a default value; and
   updating said deallocation chronological sequence indicator in said corresponding entry inserted in to said sorted sequence index if an entry of said second type corresponding to said entry of said first type is encountered during said step of scanning said sorted address index, said deallocation chronological sequence indicator being updated with a value equal to a value of a chronological sequence indicator in said entry of said second type.

16. The computer program product for analyzing memory allocation trace data of claim 9, wherein said step of dynamically maintaining a sorted sequence index comprises:
   if an entry of said second type is encountered during said step of scanning said sorted address index for which no corresponding entry of said first type has previously been encountered during said step of scanning said sorted address index, then inserting a corresponding entry in said sorted sequence index, said corresponding entry in said sorted sequence index having a chronological sequence indicator equal to an assumed value, said corresponding entry in said sorted sequence index further having a deallocation chronological sequence indicator equal to a value of a chronological sequence indicator in said entry of said second type.

17. A method for analyzing memory allocation trace data for a computer program, comprising the steps of:
   recording a plurality of memory block allocations and deallocations during execution of said computer program;
   constructing a first index, said first index containing entries of a plurality of types, including a first type entry corresponding to a memory block allocation, a second type entry corresponding to a memory deallocation, and a third type entry corresponding to a memory address inquiry, said first index being sorted by one of the set consisting of: (a) address, and (b) chronological sequential indicator;
   scanning said first index in order of said entries, said scan proceeding sequentially in defined order of said first index;
   dynamically maintaining a second index of entries while performing said step of scanning said first index, each entry in said second index corresponding to a respective memory allocation, said second index entries being sorted by the other of said set consisting of: (a) address, and (b) chronological sequential indicator which is not used to sort said first index, said second index containing all memory allocations applicable to a current location in said first index in the sequential order of said scanning step;
   upon encountering a memory address inquiry entry while performing said step of scanning said first, using a parameter value of the encountered memory address inquiry entry to locate an entry in said second index, said entry in said second index representing a memory block allocation corresponding to the encountered memory address inquiry entry, and recording an association between the encountered memory address inquiry entry and the memory block allocation corresponding to said encountered memory address inquiry entry.

* * * * *